R. P. SIMMONS

July 12, 1932. WELL PUMPING APPARATUS Re. 18,527

Original Filed Aug. 16, 1927 3 Sheets-Sheet 1

RICHARD P SIMMONS
INVENTOR

BY Victor J. Evans
ATTORNEY

WITNESS: G. Newton Lusby.

July 12, 1932.

R. P. SIMMONS

WELL PUMPING APPARATUS

Re. 18,527

Original Filed Aug. 16, 1927 3 Sheets-Sheet 2

RICHARD P SIMMONS
INVENTOR

BY Victor J. Evans
ATTORNEY

WITNESS: G. Newton Lively

July 12, 1932.

R. P. SIMMONS

WELL PUMPING APPARATUS

Original Filed Aug. 16, 1927

Re. 18,527

3 Sheets-Sheet 3

WITNESS: G. Newton Fusby

RICHARD P SIMMONS
INVENTOR

BY Victor J. Evans
ATTORNEY

Reissued July 12, 1932 Re. 18,527

UNITED STATES PATENT OFFICE

RICHARD P. SIMMONS, OF NEW YORK, N. Y.

WELL PUMPING APPARATUS

Original No. 1,687,399, dated October 9, 1928, Serial No. 213,381, filed August 16, 1927. Application for reissue filed January 15, 1931. Serial No. 508,969.

The primary object of the invention resides in an apparatus for increasing the flow of oil from oil wells where the pressure behind the oil is insufficient to produce a strong and steady flow at the surface. In some instances, oil wells which contain large quantities of oil cannot be worked as the force or pressure behind the same is insufficient to lift a column of oil to the surface, although the pressure may be capable of lifting the oil a part of the distance.

Another object of the invention is to provide a well pumping apparatus which includes a series of pumps arranged at suitable spaced intervals along the depth of a well from the bottom upward, each serving to lift the column of oil upward to the next higher pump until the oil flows free at the mouth of the well.

A further object is the provision of a series of pumps which are lowered in a well and supported at spaced intervals for lifting oil therefrom, in conjunction with compressed air which is forced into the oil discharge pipe at suitable intervals.

A still further object is to provide an apparatus for increasing the capacity of a well by increasing the natural pressure behind the oil.

With these and other objects in view, the invention resides in certain novel construction and combination and arrangement of parts, the essential features of which are hereinafter fully described, are particularly pointed out in the appended claims, and are illustrated in the accompanying drawings, in which:

Figure 1:
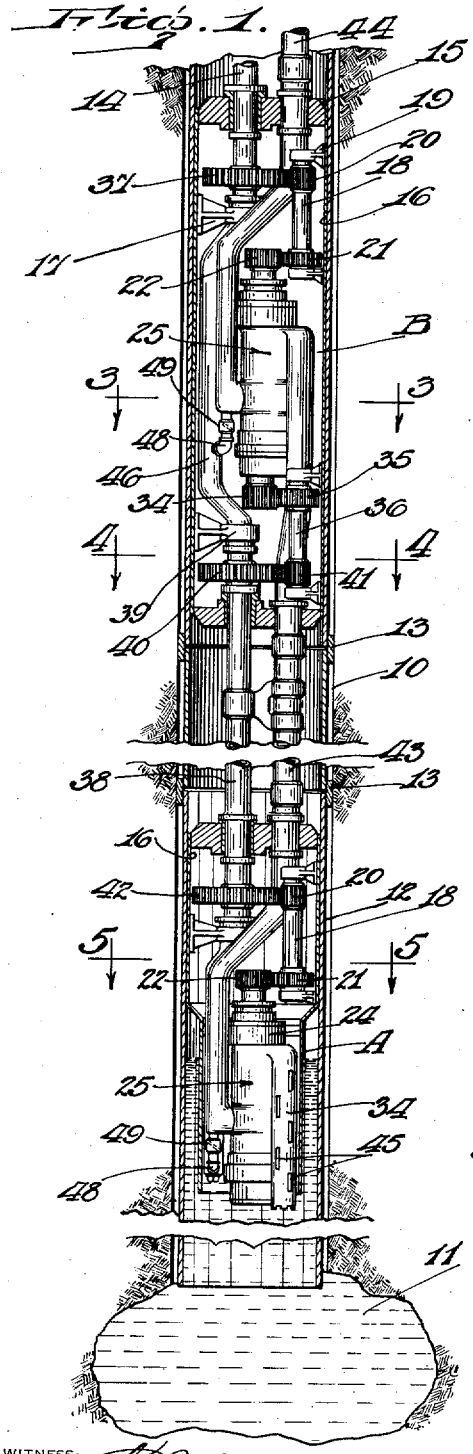
Figure 1 is a vertical sectional view through an oil well with my improved apparatus therein.
Figure 2:
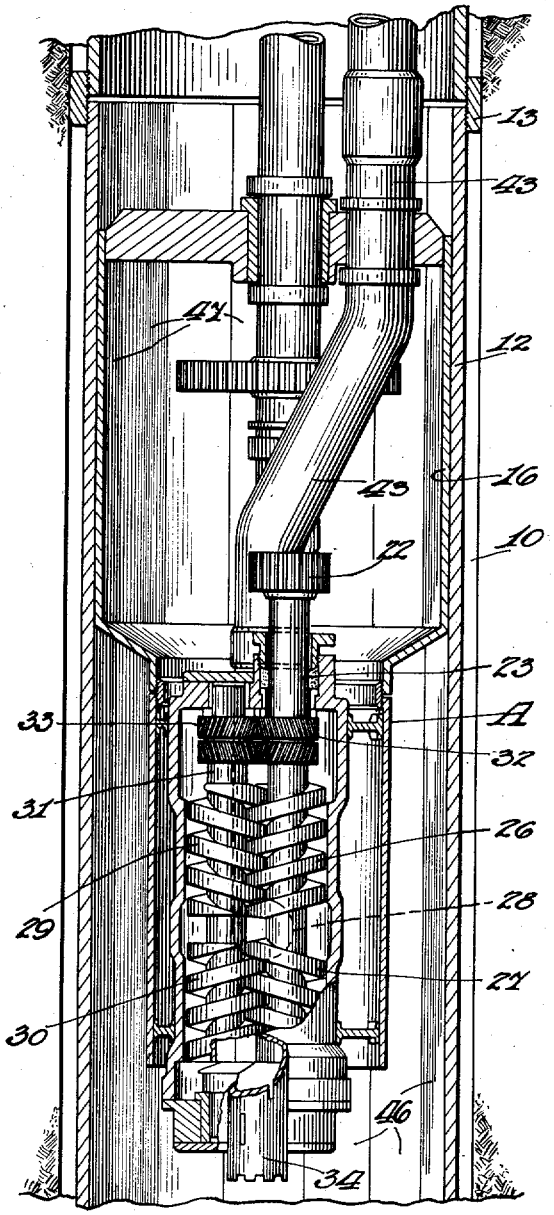
Figure 2 is an enlarged vertical sectional view through one of the pump units.
Figure 3:
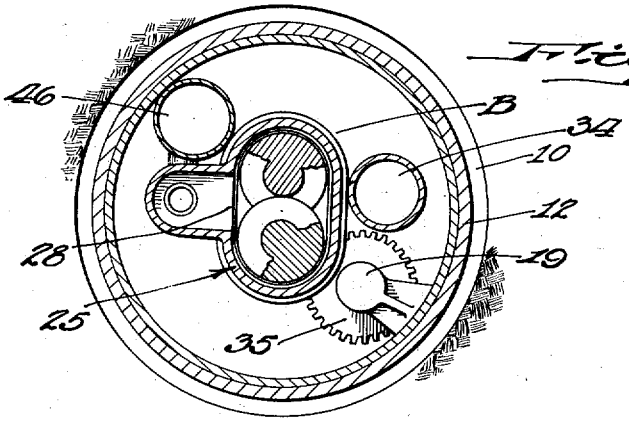
Figure 3 is a horizontal sectional view on the line 3—3 of Figure 1.
Figure 4:
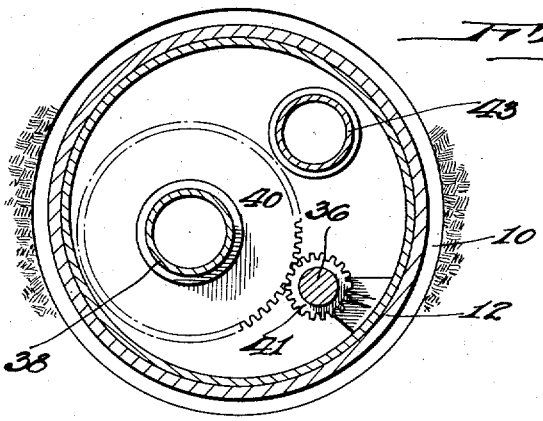
Figure 4 is a similar view on the line 4—4 of Figure 1.

Referring more particularly to the drawings, the reference numeral 10 designates the shaft of an oil well which leads from the basin or head 11 to the surface of the earth. Disposed within the shaft and extending the entire length thereof are shell sections 12 of suitable lengths which have their meeting ends externally threaded for threading engagement with couplings or collars 13. The shaft of the well is bored larger in diameter than the shell sections to accommodate the collars 13 which cause the shell sections to be disposed in spaced relation to the walls of the well. My improved pumping apparatus is contained within the shell members which form a wall for the well for preventing the walls from caving in and which also prevent dirt and rock from coming in contact with the working parts of the pumping apparatus. The apparatus includes a lower pump unit A which is disposed at the bottom of the well where it is immersed in the oil below the normal level thereof while pump units B are arranged upward within the casing at suitable spaced intervals, as for instance one thousand feet apart. The number of pump units necessary will of course depend upon the depth of the particular well and the amount of natural pressure behind the oil.

Extending downward into the casing from the surface of the earth is a driving rotatable tubular shaft 14 which passes through the top header 15 of the casing 16 of the top pump unit B and which co-acts with a bearing 17 for the lower end of the shaft for providing bearings therefor. All of the pump units are driven by the power taken from the driving shaft 14 and each pump unit includes a counter-shaft 18 mounted in bearings 19 extending inward from the walls of the casing 16, and which counter-shaft has gears 20 and 21 fixed thereon. The gear 21 of each unit meshes with a gear 22 fixed to the top end of a rotating shaft 23 which extends through the casing 24 of a rotary pump 25. The pump 25 of each unit is of the type known as the "Quimby pump" which includes a right hand screw 26 and a left hand screw 27 provided on the shaft 23, the inner ends of the screws being spaced from each other at a point adjacent the discharge opening 28. The screws on the shaft 23 mesh with opposite pitch screws 29 and 30 provided on a counter-shaft 31 journalled in the top and bottom walls of the casing 16. Power is transmitted from the shaft 23 to the counter-shaft 31 by coacting gears 32 and 33 respectively whereby the shafts turn in opposite directions to force oil from the outer ends of the screws toward the discharge opening 28. Each pump has an inlet 34 which communicates with the outer ends of the screws which pick up the oil and force it through the discharge 28 under pressure.

For the purpose of transmitting the power from one pump to the next lower adjacent pump, I provide the lower end of each shaft 23 with a gear 34 which meshes with a gear 35 on a counter-shaft 36. The uppermost pump unit derives its power from the power shaft 14 through a gear 37 fixed to the power shaft, but all pump units below receive their power through a tubular counter-shaft 38 journalled in bearings 39 and in the headers 15 of the adjacent pump units. The shaft 38 has a gear 40 which meshes with the gear 41 on the counter-shaft 36 and a gear 42 which meshes with the gear 20 of the next lower unit, which drives the next lower pump unit through its shaft 18, and meshing gears 21 and 22.

The discharge opening 28 of one pump is connected to the inlet side of the next upper adjacent pump by discharge pipes 43, while the discharge side of the uppermost pump has a pipe 44 connected thereto which rises to the surface of the well and from which the oil is led off to the usual containers.

Figure 5:
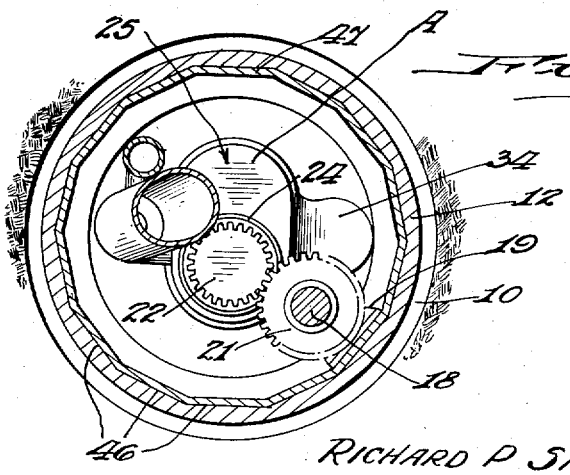
Figure 5 is a similar view on the line 5—5 of Figure 1.

The lower end of the casing 16 of the pump unit A is reduced in diameter to snugly house the same and the inlet pipe 34 of the same has openings 45 therein through which the oil from the basin is taken in. The lowermost shell section 12 is also slightly different than the other shell sections as the same has its inner wall provided with a number of flat surfaces 46 shown best in cross section in Figure 5 of the drawings. The upper end of the casing 16 of the lowermost pump unit has its side walls provided with flat surfaces 47 corresponding in number to the flat surfaces on the shell section to prevent any possible rotation of the pump unit with respect to the shell section.

From the description thus far, it will be seen that upon rotation of the power shaft 14, simultaneous rotation will be imparted to the pumps, causing the lowermost pump to lift the oil from the basin to the next higher pump from where it is lifted to the next higher pumps until it is discharged at the surface of the well. In certain wells, where the pressure is sufficient to lift a slow column of oil, my apparatus will tend to increase the flow, but in other wells, even the pumping apparatus so far described may not be capable of bringing the oil to the surface. In such case, I pass compressed air through the tubular driven shaft 14 which is joined to the hollow counter-shafts 38 through pipe connections 46 so as to provide a continuous air pipe down through the well to the lowermost pump unit A. The compressed air pipe is tapped into the discharge pipe 43 of each unit adjacent the outlet opening 28 therein through an elbow 48 in each of which a check valve 49 is provided for preventing the oil from entering the air line should the pressure therein drop below the pressure in the oil line. By introducing compressed air in the oil line at every pumping station or unit, I am able to assist the pumps in lifting the oil to the surface and which under any condition tends to increase the production of the well.

Figure 6:
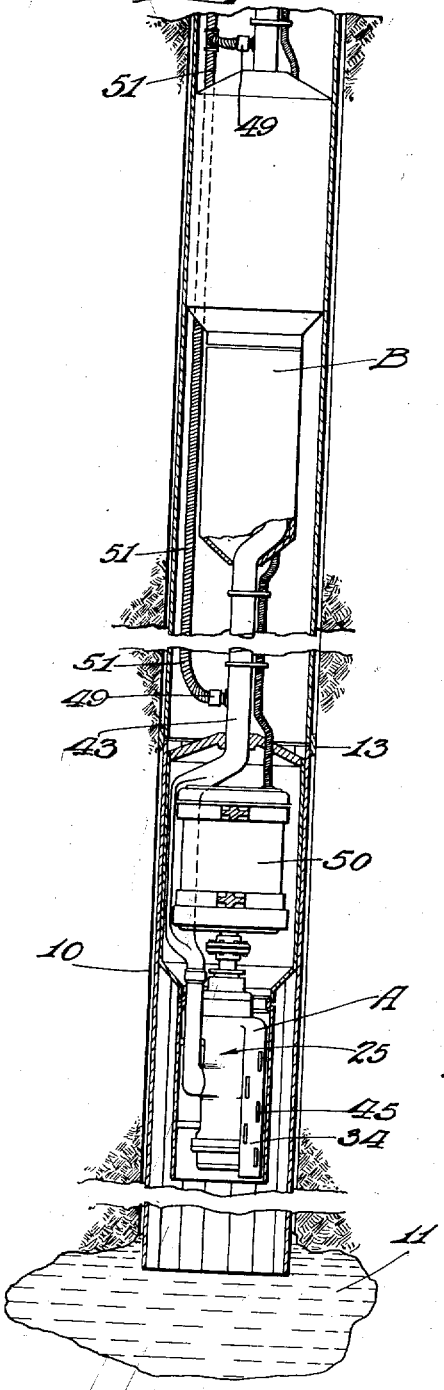
Figure 6 is a vertical sectional view through a well showing a slightly modified form of pumping unit.
Figure 7:
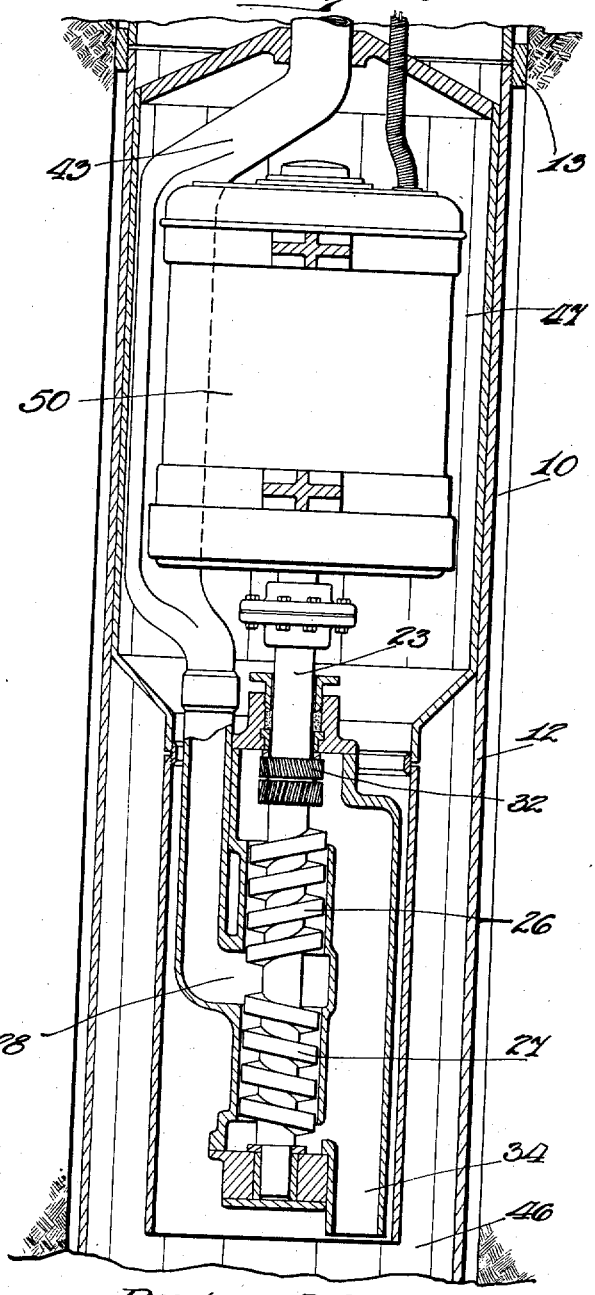
Figure 7 is an enlarged vertical sectional view through the lowermost pump unit.

In Figures 6 and 7 of the drawings, I have shown a slightly modified construction of my invention and in which like reference characters referred to in the preferred form designate like parts. In this form, each pump receives its own power from a separate source of power rather than from a common source as hereinbefore mentioned. The shaft 23 of each pump is operatively connected to an electric motor 50. In lieu of the air pipes shown in the preferred form, I pass a flexible hose 51 down into the well casing and tap in therefrom to the discharge pipes 43 above the respective units. Aside from these differences, the construction is identical with that of the preferred form.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

I claim as new:—

1. In a well pumping apparatus, a plurality of vertically spaced pump units arranged in a well one above the other, each of said pump units including a casing, a rotary pump within each casing, each casing having an inlet and an outlet, the outlet of the casing of the lower pump unit being in communication with the inlet of the pump unit above it, discharge conduit means connected with the outlet of said above pump unit and extending to the surface of the well, a hollow shaft journaled in the well, means for transmitting power from said shaft to the upper rotary pump, a second hollow shaft journaled in said well, means for transmitting power from said second hollow shaft to the lower pump unit, and means cooperating with said hollow shafts for supplying compressed air to each outlet to assist in lifting the fluid pumped to the head of the well.

2. In a well pumping apparatus, a plurality of pump units arranged one above the other in a well, each of said pump units including a casing, a driven rotatable hollow shaft extending into the well, a rotary pump in each casing, means for driving the rotary pump of the upper pump unit from the hollow shaft, a second hollow shaft in the well, means for driving the second hollow shaft from the first hollow shaft, a rotary pump in the casing of the lower pump unit, means for driving the last named rotary pump from the second hollow shaft, each pump unit having an inlet and an outlet, the outlet of the lower pump unit being in communication with the inlet of the upper pump unit, a discharge conduit communicating with the outlet of the upper pump unit and extending to the head of the well, a conduit coupled to the first and second hollow shafts, and a pipe tap communicating with each hollow shaft and establishing communication with the outlet of one of the pump units to supply said outlet with air under compression through the hollow shafts and said conduit to the discharge conduit, to assist in lifting the fluid to the head of the well.

3. In a well pumping apparatus, a plurality of pump units adapted to be arranged in spaced relation within a well, each of said pump units including a casing, driven rotatable screws within said casing, inlets in said casing at the outer ends of said screws, an outlet in said casing intermediate the ends of said screws, discharge piping connecting the outlet of one pump unit with the inlet of the next higher pump unit and the outlet of the uppermost unit with the surface of a well, transmission means between the driven screws of the respective pumps for simultaneously operating all of said pumps in unison, and a compressed air line tapped into said discharge piping at suitable points therealong for assisting said screws in lifting the pumped fluid through said piping.

4. In a well pumping apparatus, a plurality of spaced pump units, one above the other, each of said pump units including a casing closed at opposite ends, a driven rotatable hollow shaft extending into the top end wall of the uppermost pump unit, a rotary pump contained within said casing having an inlet and an outlet, oil discharge piping connecting the outlet of one pump unit with the inlet of the next higher pump unit, a hollow rotatable shaft journalled in the end walls of each adjacent pair of pump units, stationary pipes between the hollow shafts for providing a compressed air conduit, transmission means between the shafts and the respective pumps, and pipe taps connecting the compressed air conduit with said oil discharge piping.

5. In a well pumping apparatus, a plurality of spaced pump units one above the other, each of said pump units including a casing closed at opposite ends, a driven rotatable hollow shaft extending into the top end wall of the uppermost pump unit, a rotary pump contained within said casing having an inlet and an outlet, oil discharge piping connecting the outlet of one pump unit with the inlet of the next higher pump unit, a hollow rotatable shaft journalled in the end walls of each adjacent pair of pump units, stationary pipes between the hollow shafts for providing a compressed air conduit, transmission means between the shafts and the respective pumps, and pipe taps connecting the compressed air conduit with said oil discharge piping, and check valves within said pipe taps for closing communication therethrough when the pressure of oil in said discharge piping drops below the air pressure in said compressed air conduit.

6. In a well pump apparatus, a plurality of pump units disposed in series in a well with the eduction end of one in communication with the induction end of the next, and a compressed air conduit in communication with all of said pump units at the eduction ends and provided with means at said points of communication to close the same except when the pressure at said eduction ends falls below that in said conduit.

7. In a well pump apparatus, a plurality of pump units disposed in series in a well with the eduction end of one in communication with the induction end of the next, and a compressed air conduit in communication with all of said pump units at the eduction ends and provided with means at said points of communication to close the same except when the pressure at said eduction ends falls below that in said conduit, said means comprising check valves disposed at said points of communication and arranged to open in response to pressure in said conduit.

Signed at New York city, county and State of New York, this 7th day of October, 1930.

RICHARD P. SIMMONS.